United States Patent [19]
Fujita

[11] Patent Number: 6,128,476
[45] Date of Patent: Oct. 3, 2000

[54] TRANSMITTING DIVERSITY CIRCUIT FOR TDMA RADIO UNIT

[75] Inventor: Noriyuki Fujita, Saitama, Japan

[73] Assignee: NEC Corporation, Tokyo, Japan

[21] Appl. No.: 09/012,557

[22] Filed: Jan. 23, 1998

[30]     Foreign Application Priority Data

Jan. 23, 1997  [JP]  Japan .................................. 9-010010

[51] Int. Cl.[7] .................................................. H04B 7/02
[52] U.S. Cl. ...................... 455/101; 455/562; 455/103; 375/299
[58] Field of Search .................................. 455/561, 562, 455/101, 103, 105, 102; 370/334; 375/299

[56]                    References Cited

U.S. PATENT DOCUMENTS

| | | | |
|---|---|---|---|
| 5,390,366 | 2/1995 | Kasugai | 455/56.1 |
| 5,448,752 | 9/1995 | Mabey | 455/33.1 |
| 5,625,627 | 4/1997 | Ishi | 370/347 |
| 5,844,632 | 12/1998 | Kishigami et al. | 348/706 |
| 5,991,613 | 11/1999 | Euscher et al. | 455/277.1 |
| 5,999,830 | 12/1999 | Taniguchi et al. | 455/574 |
| 6,006,075 | 12/1999 | Smith et al. | 455/101 |

FOREIGN PATENT DOCUMENTS

| | | |
|---|---|---|
| 0 213 780 | 3/1987 | European Pat. Off. . |
| 3-66232 | 3/1991 | Japan . |
| 4-265025 | 9/1992 | Japan . |
| 4-282922 | 10/1992 | Japan . |
| 8-195695 | 7/1996 | Japan . |
| 9-8716 | 1/1997 | Japan . |
| 10-51365 | 2/1998 | Japan . |
| 10-163936 | 6/1998 | Japan . |
| 2 315 645 | 2/1998 | United Kingdom . |
| WO 97/49199 | 12/1997 | WIPO . |

*Primary Examiner*—Edward F. Urban
*Assistant Examiner*—Marceau Milord
*Attorney, Agent, or Firm*—Young & Thompson

[57]                    ABSTRACT

Disclosed is a transmitting diversity circuit for a TDMA radio unit which has: a plurality of antennas; a plurality of transmitting circuits; a plurality of receiving circuits; a first switch which is connected with one of the plurality of transmitting circuits and selects one of the plurality of antennas; a second switch which is connected with the first switch and selects the one or the other of the plurality of transmitting circuits; a third switch which is connected with the second switch and one or more of the plurality of receiving circuits and selects one of the plurality of transmitting circuits or the one or more of the plurality of receiving circuits; a judging circuit which controls the switching of the first and second switches according to a level of received field strength to be detected by the receiving circuit connected with the third switch; wherein the one of the plurality of transmitting circuits is connected through the first to third switches with the selected one of the plurality of antennas.

4 Claims, 5 Drawing Sheets

TRANSMITTING DIVERSITY CIRCUIT FOR TDMA RADIO UNIT

FIELD OF THE INVENTION

This invention relates to a transmitting diversity circuit for a TDMA (time division multiple access) radio unit, and more particularly to, a transmitting diversity circuit of a base station unit for mobile radio station, e.g. a PHS (personal handyphone system) base station unit, provided with several antennas and radio circuits.

BACKGROUND OF THE INVENTION

Recently, a demand for mobile communication devices, such as a portable telephone and PHS, is increased with the progress of mobile communication technology. In the case of PHS, several millions of terminal sets have been sold within a year from the beginning of PHS availability. Therefore, hundreds of thousand of base stations for PHS terminals will be needed in one sales company.

In the PHS system, a working frequency band of 1.9 GHz, a carrier interval of 300 KHz, an access manner of multi-carrier TDMA/TDD (time division multiple access/time division duplexing), a modulation manner of $\pi/4$ shift QPSK (quadrature phase shift keying), a transmission speed of 384 kbps (voice encoding speed of 32 kbps-ADPCM), an occupied frequency band of 280 kHz, and a terminal aerial power of 10 mW are used. Also, one transmission-reception wave of four-channel multiplex TDMA/TDD uses a same frequency, and therefore one TMDA/TDD frame (5 ms, 240 bits×8) is sequentially composed of four transmission slots (0.625 ms, 240 bits, 384 kbps) and four reception slots to a base station, where one slot is used as a control slot and the base station conducts the transmission and reception while using the other slots to three terminal stations. The transmission or reception between base station and terminal station is connected through a local exchange network or an exchange to a telephone exchange network, thereby allowing the communication between PHS terminals or telephone and PHS terminal. Due to the above specification, a paired band for transmission and reception is not necessary, therefore facilitating frequency management. Also, a diplexer is not necessary, therefore enabling miniaturization. Furthermore, transmission and reception can be conducted in a same fading state, and only the base station can control the diversity.

However, in the conventional transmitting diversity circuit, there is a problem that the consumed power of a power amplifier is increased. This is because a synthesizer disposed between the power amplifier and an antenna causes a passing loss of about 3 dB and therefore the power amplifier is needed to excessively increase its output level.

Also, there is another problem that the cost of the power amplifier is increased. This is because a transistor with an increased chip size is needed to excessively increase its output level.

SUMMARY OF THE INVENTION

Accordingly, it is an object of the invention to provide a transmitting diversity circuit where the passing loss after a power amplifier can be reduced while suppressing a deterioration of transmission diversity effect.

According to the invention, a transmitting diversity circuit for a TDMA radio unit, comprises:

a plurality of antennas;
a plurality of transmitting circuits;
a plurality of receiving circuits;
a first switch which is connected with one of the plurality of transmitting circuits and selects one of the plurality of antennas;
a second switch which is connected with the first switch and selects the one or the other of the plurality of transmitting circuits;
a third switch which is connected with the second switch and one or more of the plurality of receiving circuits and selects one of the plurality of transmitting circuits or the one or more of the plurality of receiving circuits;
a judging circuit which controls the switching of the first and second switches according to a level of received field strength to be detected by the receiving circuit connected with the third switch;
wherein the one of the plurality of transmitting circuits is connected through the first to third switches with the selected one of the plurality of antennas.

BRIEF DESCRIPTION OF THE DRAWINGS

The invention will be explained in more detail in conjunction with the appended drawings, wherein.

DESCRIPTION OF THE PREFERRED EMBODIMENTS

Before explaining a transmitting diversity circuit for a TDMA radio unit in the preferred embodiment, the aforementioned conventional transmitting diversity circuit will be explained in FIG. 1.

Figure 1:
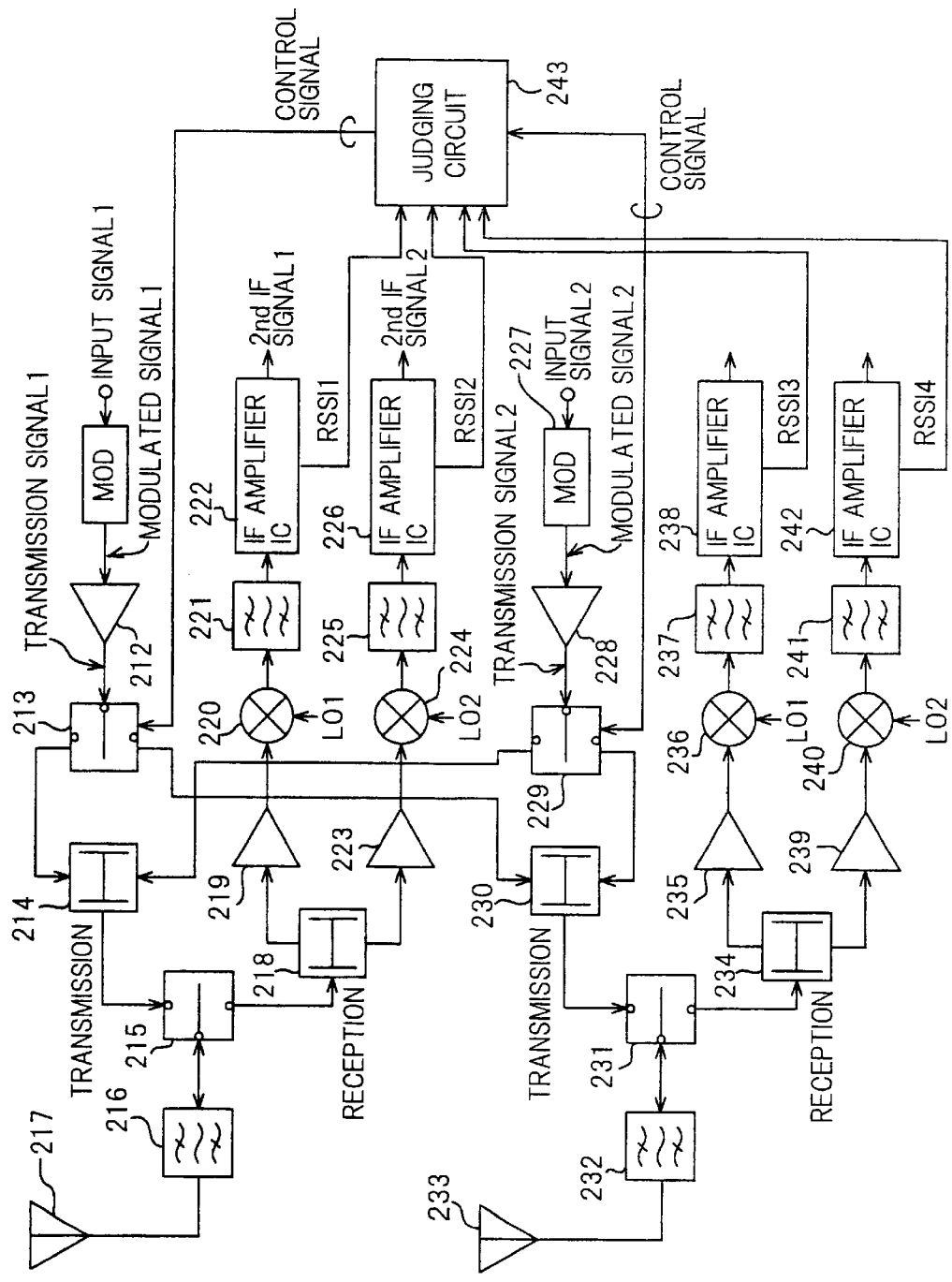
FIG. 1 is a block diagram showing a composition of a conventional PHS base station for mobile communication system.

FIG. 1 shows a conventional PHS base station unit for mobile telephone, which is operated according to the specification described above. In this example, two antennas, two transmitting circuits and two receiving circuits are provided. Referring to FIG. 1, a modulated signal 1 to be produced modulating an input signal 1 by a modulator 211 is amplified by a power amplifier 212, and then a switch 213 is controlled according to the instruction of a judging circuit 243. Thereby, the signal is passed through a synthesizer 214, a transmission-reception switch 215 and a top filter 216, or through a synthesizer 230, a transmission-reception switch 231 and a top filter 232 to be output as a transmission signal 1 from an antenna 217 or 233. Similarly, a modulated signal 2 to be produced modulating an input signal 2 by a modulator 227 is amplified by a power amplifier 228 and then is output as a transmission signal 2 from the antenna 217 or 233. Here, the antenna 217 or 233 to output transmission signal 1 is selected according to the intensities of received field strength signals RSSI 1, 2, 3 and 4.

The transmission signal 1 can be switched into two directions by the switch 213. When it is output from the antenna 217, it is passed through the synthesizer 214, switch 215 for switching the transmission and reception, and top filter 216 to the antenna 217. On the other hand, when it is output from the antenna 233, the switch 213 is switched in the direction of the synthesizer 230 and then the transmission signal 1 is passed through the synthesizer 230, switch 231, and top filter 232 to the antenna 233. Also, the transmission signal 2 can be output in like manner.

In the receiving unit, a received signal to be input to the antenna 217 is passed through the top filter 216, switched to the reception side by the switch 215 for switching the transmission and reception, divided to a top amplifier 219 and a top amplifier 223 by a distributor 218. The received signal to be input to the top amplifier 219 is low-noise amplified, then converted into a 1st IF signal by a first mixer 220. The 1st IF signal is passed through an interstage filter 221, converted into a 2nd IF signal 1 by an IF amplifier IC 222, then output therefrom. Simultaneously, the IF amplifier IC 222 outputs a DC signal (RSSI1) that represents an intensity of received filed strength at the antenna 217 according to the level of the received signal. Similarly, for the received signal to be input to the top amplifier 223, RSSI2 is output from an IF amplifier IC 226. Also, for the received signal to be input to the antenna 233, RSSI3 and RSSI4 are output from an IF amplifier IC 238 and an IF amplifier IC 242, respectively. The four signals, RSSI1 to RSSI4, are input to the judging circuit 243 and compared. According to the comparison result, the switches 213, 229 are controlled to determine which of the antennas 217, 233 outputs the transmission signals 1 and 2 on the next slot transmission timing.

The characteristic of the base station is that the transmission signals 1 and 2 can be simultaneously output from one antenna (in this case, no transmission signal is output from the other antenna). Thus, the synthesizers 214, 230 are used to synthesize two signals and simultaneously output the two transmission signals from one antenna.

However, the synthesizers 214, 230 shown in FIG. 1 are always subject to a loss corresponding to [3 dB—physical loss] due to the structure. Therefore, in order to output a predetermined output level from the antenna, it is necessary to excessively increase by a level (at least 3 dB) corresponding to the loss at the synthesizers 214, 230. Therefore, the power amplifiers 212, 228 are needed to increase the output power by more than 3 dB. Thus, the consumed power is increased to about two times. Furthermore, when linear amplification is conducted, a transistor with an output power increased so much is needed, thereby increasing the cost.

Next, a transmitting diversity circuit for a TDMA radio unit in the first preferred embodiment will be explained in FIG. 2. There is shown a radio unit in a base station for mobile communication system, where two antennas, two transmitting circuits and four receiving circuits are provided. For example, respective ones of the transmitting circuit and receiving circuit will be explained. One of the transmitting circuits is mainly composed of a modulator 111, a power amplifier 112, a switch 113 and a switch 114. Optionally, it is further composed of a switch 130 depending on the switching direction of the switch 113. After these, a transmission signal 1 is output through a switch 114 or a switch 131 and a top filter 116 or a top filter 132 from an antenna 117 or an antenna 133.

Figure 2:
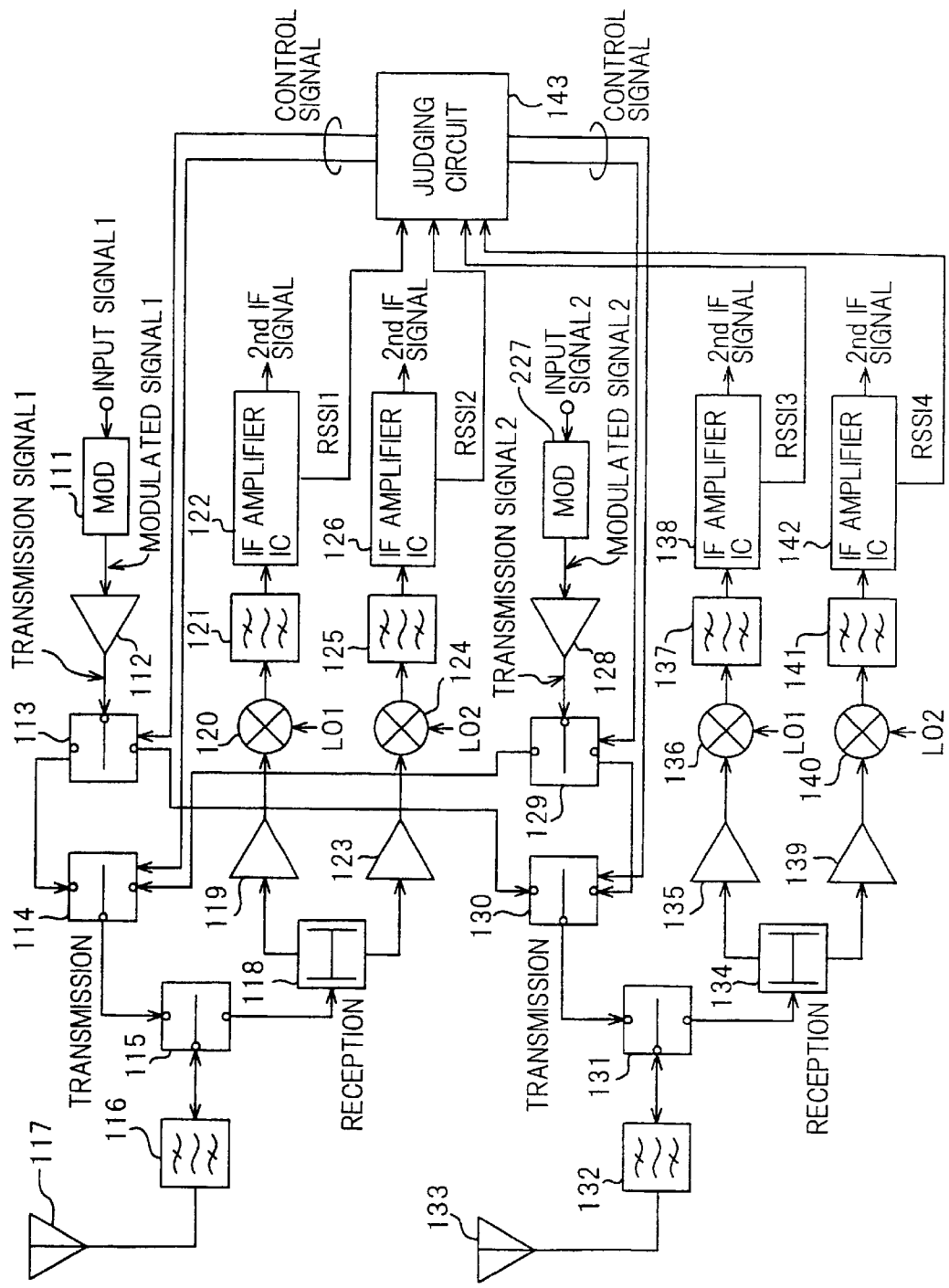
FIG. 2 is a block diagram showing a transmitting diversity circuit for a TDMA radio unit in a first preferred embodiment according to the invention.

Further explaining the transmitting circuit, as shown in FIG. 2, a modulated signal 1 to be produced by π/4 shift QPSK modulating an input signal 1 by the modulator 111 is amplified by a power amplifier 112, switched by the switch 113 according to an instruction of a judging circuit 143, passed through the switch 114 or 130 according to an instruction corresponding to the transmission slot period of the judging circuit 143, passed through a transmission-reception switch 115 or 131 and the top filter 116 or 132, then output as the transmission signal 1 from the antenna 117 or 133. Similarly, a modulated signal 2 to be produced modulating an input signal 2 by a modulator 127 is amplified by a power amplifier 128, passed through the switch 114 or 130, switch 115 or 131 and top filter 116 or 132, then output as a transmission signal 2 from the antenna 117 or 133. The antenna 177 or 133 to output the transmission signals 1, 2 is selected according to the intensities of received field strength signals RSSI1 to RSSI4.

Meanwhile, the transmission signal 1 can be switched into two directions. When it is output from the antenna 117, it is passed through the switch 114, the switch 115 for selecting the transmission or reception, and the top filter 116 to the antenna 117. On the other hand, when it is output from the antenna 133, the switch 113 is switched in the direction of the switch 130 and then the transmission signal 1 is passed through the switch 130, switch 131 for selecting the transmission or reception, and top filter 132 to the antenna 133. Also, the transmission signal 2 can be output in like manner.

On the other hand, one of the receiving circuits is mainly composed of a distributor 118, a top amplifier 119, a mixer 120, a filter 121 and an IF amplifier IC 122. The others of the receiving circuits are composed similarly. The reason why two receiving circuits are provided for one antenna is that transmission signals with different frequencies to be output from some transmitting circuits may be input to the antenna and therefore receiving circuits corresponding to those frequencies are necessary. The level of a received signal is detected as a RSSI signal by the IF amplifier IC 122. The received signal is input through the antenna 117 and top filter 116 to the IF amplifier IC 122. RSSI1, RSSI2, RSSI3 and RSSI4 to be output from the respective receiving circuits are compared and judged by the judging circuit 143. The judging circuit 143 outputs a switching control signal to the switches 113, 114, 129 and 130.

Figure 3:
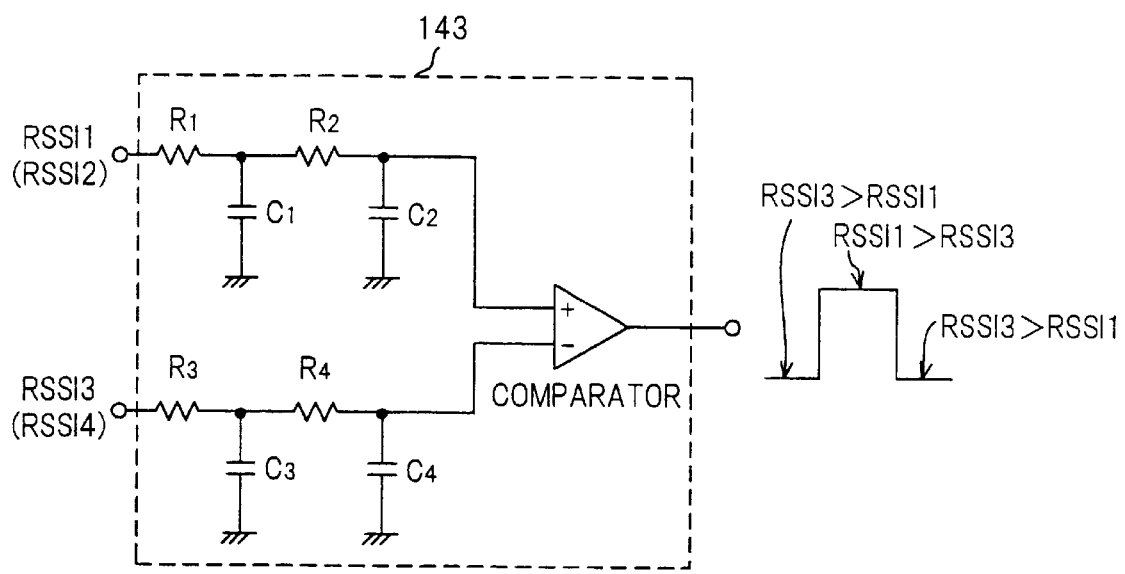
FIG. 3 is a circuit diagram showing an example of a judging circuit in FIG. 2

The judging circuit 143 is, for example, composed of a comparator and RC filters which serve to suppress a variation in the input signal (RSSI1 to RSSI4), as shown in FIG. 3. In the comparison between RSSI1 and RSSI3, when RSS1 is greater than RSSI3, the switches 114, 113 are switched to pass the transmission signal 1 to the antenna 117. At this time, the switches 130, 129 are necessarily switched to pass the transmission signal 2 to the antenna 133. On the contrary, when RSSI3 is greater than RSSI1, the switches 114, 113 are switched to pass the transmission signal 1 to the antenna 133. At this time, the switches 130, 129 are necessarily switched to pass the transmission signal 2 to the antenna 117. Also in the comparison between RSSI2 and RSSI4, the switching control for the transmission signal 2 is conducted in like manner. When this comparison result competes with the comparison result for RSSI1 and RSSI3, for example, both results select the antenna 117, it may be predetermined that the comparison result for RSSI1 and RSSI3 is a higher priority then the comparison result for RSSI2 and RSSI4. Meanwhile, when two antennas are provided, the comparison result for RSSI1 and RSSI3 can be inverted to give the other antenna control signal. In this case, the comparison between RSSI2 and RSSI4 can be omitted since the other can be necessarily determined when one is determined.

The operation of the transmitting diversity circuit in the first embodiment shown in FIG. 2 will be further detailed below. In the receiving circuits, a received signal to be input to the antenna 117 is passed through the top filter 116 and then is switched into the reception side by the switch 115. A time period that the switch 115 is switched into the reception side is seven slot periods of eight slot periods for the TDMA/TDD system, where the switch 115 is switched into the transmission side for one slot period. Then, the received signal is divided for the top amplifiers 119, 123 by the distributor 118. The received signal to be input to the top amplifier 119 is low-noise amplified, then converted into a 1st IF signal by a 1st mixer 120. The 1st IF signal is passed through an interstage filter 121, converted into a 2nd IF signal by an IF amplifier IC 122, supplied to a post-demodulator (not shown), connected to a telephone network after the demodulation. Simultaneously, the IF amplifier IC 122 outputs a DC signal (RSSI1) according to the level of the received signal. Similarly, for the received signal to be input to the top amplifier 123, RSSI2 is output from an IF amplifier IC 126. On the other hand, for a received signal to be input to the antenna 133, RSSI3 and RSSI4 are output from IF amplifier ICs 138 and 142, respectively in like manner. RSSI1 to RSSI4 are input to the judging circuit 143 and compared. According to the comparison result, the switches 113, 114, 129 and 130 are controlled so as to determine which of the antennas 117 or 133 outputs the transmission signals 1 or 2 on the next-slot transmission timing corresponding to ⅛ period of one TDMA/TDD frame. Here, the levels of received signals to the transmission signal 1 are given by RSSI1 and RSSI3, and the levels of received signals to the transmission signal 2 are given by RSSI2 and RSSI4.

When RSSI1 is greater than RSSI3, the transmission signal 1 is output from the antenna 117. When RSSI3 is greater than RSSI1, the transmission signal 1 is output from the antenna 133. Also, when RSSI2 is greater than RSSI4, the transmission signal 2 is output from the antenna 117. When RSSI4 is greater than RSSI2, the transmission signal 2 is output from the antenna 133.

The characteristic of the invention is that the transmission signals 1 and 2 are not simultaneously output from the same antenna. This is necessarily derived from the circuit composition using the switches 114 and 130. When a same antenna is selected, the antenna selection can be determined according to a priority order. For example, it can be predetermined that the antenna selection for the transmission signal 1 is higher priority to that for the transmission signal 2 and therefore the transmission signal 2 is output from the second-level antenna (in this embodiment, the other of the two antennas). Probability that a same antenna will be selected is about ¼(=½×½), and therefore probability that a deterioration of diversity effect will occur is no more than about 25%. As compared with this, the reduction in cost and consumed power due to the 3 dB reduction of output power in the power amplifiers 112, 128 are more advantageous.

Figure 4:
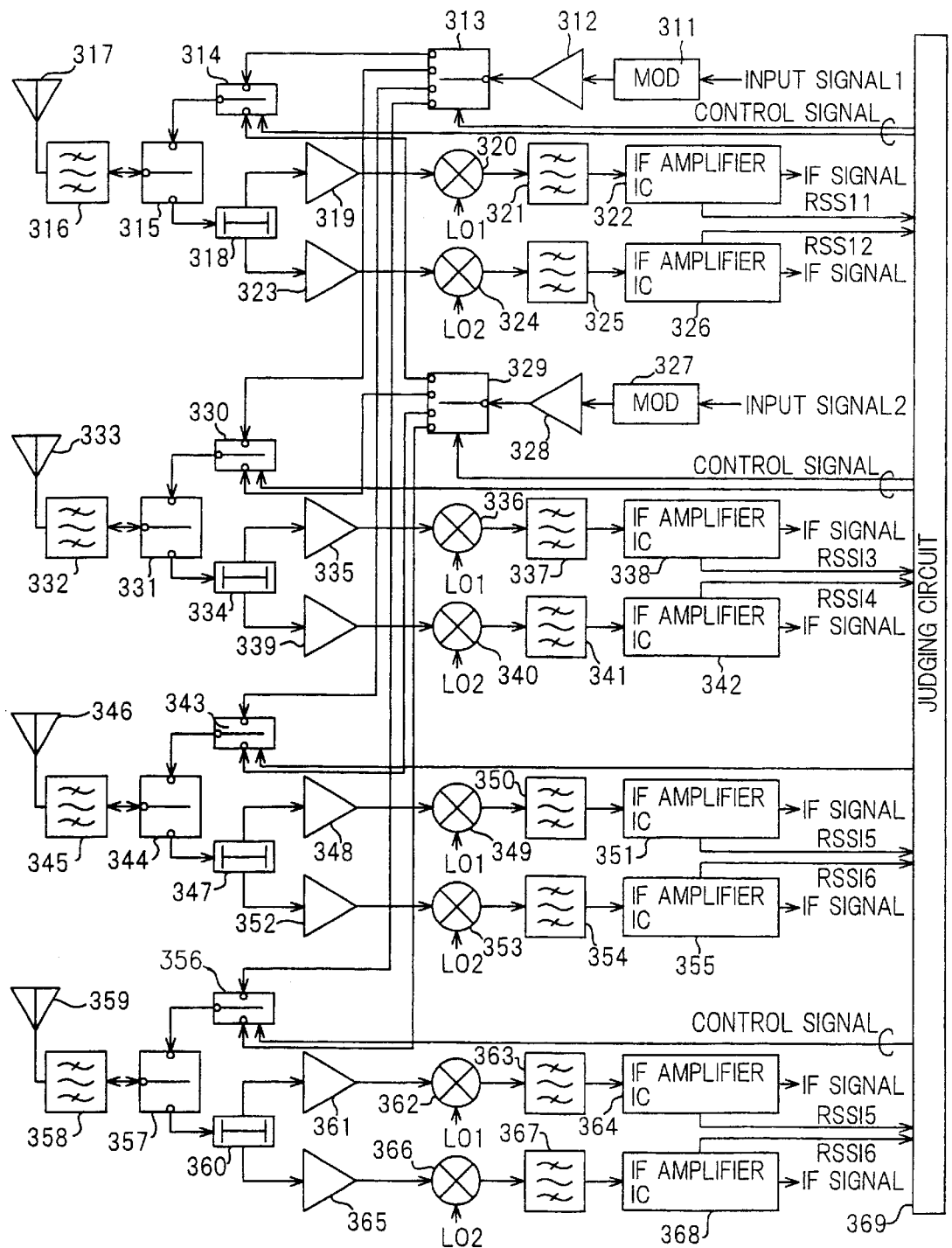
FIG. 4 is a block diagram showing a transmitting diversity circuit for a TDMA radio unit in a second preferred embodiment according to the invention.

A transmitting diversity circuit for a TDMA radio unit in the second preferred embodiment will be explained in FIG. 4. There is shown a radio unit in a PHS base station for mobile communication system, where four antennas, eight receiving circuits where two receiving circuits are provided for each antenna and two transmitting circuits are provided.

The characteristic of this embodiment is that probability that transmission waves will be output from a same antenna is about 1/16(=¼×¼) and therefore a deterioration of transmission diversity effect is reduced to about 6.3%.

In a transmitting circuit of the second embodiment, a modulated signal 1 to be produced by π/4 shift QPSK modulating an input signal 1 by a modulator 311 is amplified by a power amplifier 312, switched by a switch 313 according to an instruction of a judging circuit 369, passed through a switch 314, 330, 343 or 356 according to an instruction corresponding to the transmission slot period of the judging circuit 369, passed through a transmission-reception switch 315, 331, 344 or 357 and a top filter 316, 332, 345 or 358, then output as a transmission signal 1 from an antenna 317, 333, 346 or 359. Similarly, a modulated signal 2 to be produced modulating an input signal 2 by a modulator 327 is amplified by a power amplifier 328, passed through the switch 314, 330, 343 or 356, switch 315, 331, 344 or 357 and top filter 316, 332, 345 or 358, then output as a transmission signal 2 from the antenna 317, 333, 346 or 359. The antenna 317, 333, 346 or 359 to output the transmission signals 1, 2 is selected according to the intensities of received field strength signals RSSI1 to RSSI8.

On the other hand, one of the receiving circuits is mainly composed of a distributor 318, a top amplifier 319, a mixer 320, a filter 321 and an IF amplifier IC 322. The others of the receiving circuits are composed similarly. The level of a received signal is detected as a RSSI signal by the IF amplifier IC 322. The received signal is input through the antenna 317 and top filter 316 to the IF amplifier IC 322. RSSI1 to RSSI8 to be output from the respective receiving circuits are compared and judged by the judging circuit 369. The judging circuit 369 outputs a switching control signal to the switches 313, 314, 329, 330, 343 and 356.

RSSI1 to RSSI8 are input to the judging circuit 369 and compared. According to the comparison result, the switches 313, 314, 329, 330, 343 and 356 and are controlled by the judging circuit 369 so as to determine which of the antennas 317, 333, 346 and 359 outputs the transmission signals 1 or 2 on the next-slot transmission timing corresponding to ⅛ period of one TDMA/TDD frame. Here, the levels of received signals to the transmission signal 1 are given by RSSI1, RSSI3, RSSI5 and RSSI7, and the levels of received signals to the transmission signal 2 are given RSSI2, RSSI4, RSSI6 and RSSI8. According to the result of comparing the received field strength signals, RSSI1, RSSI3, RSSI5 and RSSI7 while giving a priority order to the corresponding antennas, the transmission signal 1 is output from an antenna corresponding to the greatest RSSI. Also, according to the result of comparing the received filed strength signals, RSSI2, RSSI4, RSSI6 and RSSI8 while giving a priority order to the corresponding antennas, the transmission signal 2 is output form one, two or three antennas to be selected according to the priority order. Such a judgement may be conducted for each TDMA/TDD frame or every a few frames according to a preset condition of the base station.

Figure 5:
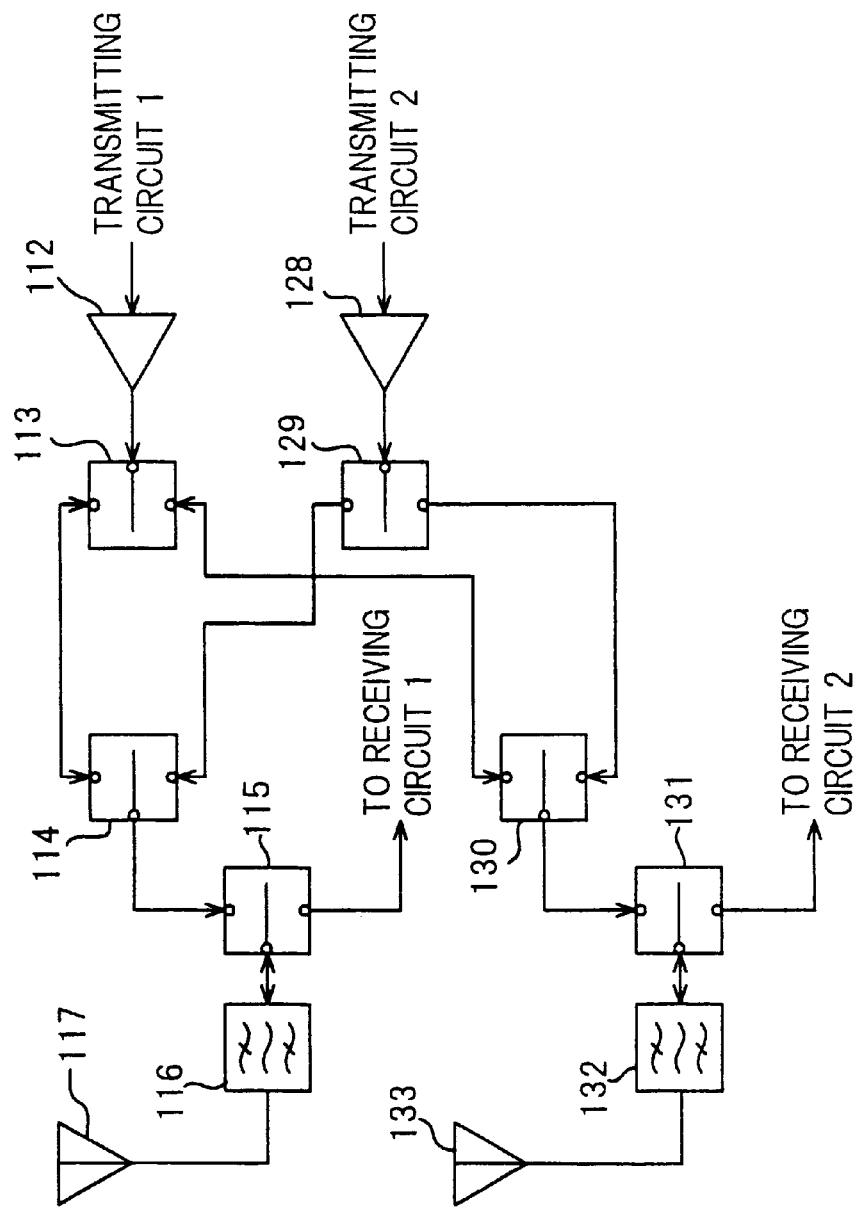
FIG. 5 is a block diagram showing a transmitting diversity circuit for a TDMA radio unit in a third preferred embodiment according to the invention.

A transmitting diversity circuit for a TDMA radio unit in the third preferred embodiment will be explained in FIG. 5. In the third embodiment, two transmitting circuits and two antennas are provided. Switches 114 and 130 have means for switching transmission signals 1 and 2. In the conventional diversity circuits, these are signal synthesizers. Thus, by using the switches 114, 130, a loss at the switch is reduced to about 0.5 dB (in case of 1.9 GHz frequency band). Therefore, the transmission loss can be reduced by about 3 dB as compared with the case using the synthesizer.

In the conventional diversity circuits, the transmission signals from the transmitting circuits 1, 2 are randomly output from antennas 117, 133. Therefore, when outputting from a same antenna, the transmission signals have to be synthesized into one signal.

In this embodiment, switches 113 to 115, 130 and 131 can be switched by the control of a judging circuit (not shown).

The transmission signal 1 from the transmitting circuit 1 is passed through a power amplifier 112, switch 113, switch 114 or 130, switch 115 or 131 and top filter 116 or 132, then output from the antenna 117 or 133. The transmission signal 2 is also output from the antenna 117 or 133 in like manner. Which of the antennas outputs the transmission signal is judged by levels of field strength of received signals to be input from receiving circuits 1, 2 to the judging circuit.

In this embodiment, several signals cannot be simultaneously output from a same antenna since the switches 114, 130 are used in place of the conventional synthesizer. Therefore, a deterioration of transmission diversity effect will occur to a degree. However, a) probability that several signals will be output from a same antenna is reduced. For example, in case of two antennas, the probability is ¼(½×½), and, in case of four antennas, the probability is ¹⁄₁₆(¼×¼). Also, b) in case of four antennas, one transmission signal is output from a normally selected antenna with the highest RSSI level. The other transmission signal is output from the second level antenna. Apparently, only diversity effect for three antennas can be obtained. However, the deterioration is small since the transmission diversity gain difference between four antennas and three antennas lies within 1 dB.

Due to the above merits a) and b), the transmission loss can be reduced without causing a big deterioration. As a result, a low consumed power (about ½) and a low cost (⅓ power amplifier) can be realized.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A transmitting diversity circuit for a TDMA radio unit, comprising:

a plurality of antennas;

a plurality of transmitting circuits;

a plurality of receiving circuits;

a first switch which is connected with one of said plurality of transmitting circuits and selects one of said plurality of antennas;

a second switch which is connected with said first switch and selects said one or the other of said plurality of transmitting circuits;

a third switch which is connected with said second switch and one or more of said plurality of receiving circuits and selects one of said plurality of transmitting circuits or said one or more of said plurality of receiving circuits;

a judging circuit which controls the switching of said first and second switches according to a level of received field strength to be detected by said receiving circuit connected with said third switch;

wherein said one of said plurality of transmitting circuits is connected through said first to third switches with said selected one of said plurality of antennas.

2. A transmitting diversity circuit for a TDMA radio unit, according to claim 1, wherein:

said plurality of antennas are connected with said plurality of receiving circuits, each of said plurality of receiving circuits detecting a level of received field strength from a received signal to be received through corresponding one of said plurality of antennas, and transmission signals to be output from said plurality of transmitting circuits are assigned to each of said plurality of antennas in such a manner that a transmission signal to be output from first one of said plurality of transmitting circuits is output from an antenna with the highest of said level of received field strength and a transmission signal to be output from second one of said plurality of transmitting circuits is output from an antenna with the highest or the second highest of said level of received field strength.

3. A transmitting diversity circuit for a TDMA radio unit, according to claim 1, wherein:

said first and second switches are selected only in one or more slot, which is assigned to a transmission signal to be output from said plurality of transmitting circuits, of n slots according to TDMA system.

4. A transmitting diversity circuit for a TDMA radio unit, according to claim 1, wherein:

said third switch is connected to the side of said selected transmission circuit on one or more slot, which is assigned to a transmission signal to be output from said plurality of transmitting circuits, of n slots according to TDMA system, and is connected to the side of said selected one or more of said plurality of receiving circuits in the other slot of said n slots.

* * * * *